United States Patent
Wonderlich et al.

(10) Patent No.: US 12,063,877 B2
(45) Date of Patent: Aug. 20, 2024

(54) GROUND FOLLOWING OPTIMIZATION WITH DOWNFORCE CONTROL SYSTEMS AND METHODS

(71) Applicant: DEERE & COMPANY, Moline, IL (US)

(72) Inventors: Grant J. Wonderlich, Milan, IL (US); Colter W. Kinney, Lohrville, IA (US); Bradley A. Wackerle, Delmar, IA (US); Nathan A. Mariman, Davenport, IA (US); James R. Peterson, Annawan, IL (US); Randall A. Maro, Davenport, IA (US); Kenneth E. Herrmann, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 391 days.

(21) Appl. No.: 17/387,466

(22) Filed: Jul. 28, 2021

(65) Prior Publication Data

US 2023/0036582 A1    Feb. 2, 2023

(51) Int. Cl.
| | | |
|---|---|---|
| *A01B 63/00* | (2006.01) | |
| *A01C 5/06* | (2006.01) | |
| *A01C 7/20* | (2006.01) | |
| *G05D 15/01* | (2006.01) | |

(52) U.S. Cl.
CPC ............ *A01B 63/008* (2013.01); *A01C 5/062* (2013.01); *A01C 7/208* (2013.01); *G05D 15/01* (2013.01)

(58) Field of Classification Search
None
See application file for complete search history.

(56) References Cited

U.S. PATENT DOCUMENTS

| | | | |
|---|---|---|---|
| D808,442 S | 1/2018 | Brueggen et al. | |
| 2018/0325021 A1* | 11/2018 | Connell | A01B 73/044 |
| 2019/0208698 A1* | 7/2019 | Maxton | A01C 7/203 |
| 2020/0053944 A1 | 2/2020 | Sivinski | |
| 2020/0060060 A1* | 2/2020 | Bassett | A01C 5/06 |
| 2020/0084951 A1 | 3/2020 | Fanshier et al. | |
| 2020/0100423 A1* | 4/2020 | Dienst | A01C 5/066 |
| 2020/0337203 A1* | 10/2020 | Stoller | A01B 63/045 |

(Continued)

FOREIGN PATENT DOCUMENTS

| | | | | |
|---|---|---|---|---|
| EP | 3957147 A1 | 2/2022 | | |
| WO | WO-2019157521 A1 * | 8/2019 | | A01B 63/10 |

OTHER PUBLICATIONS

Extended European Search Report and Written Opinion issued in European Patent Application No. 22182121.8, dated Dec. 8, 2022, in 09 pages.

*Primary Examiner* — Amelia Vorce
(74) *Attorney, Agent, or Firm* — Taft Stettinius & Hollister LLP; Stephen F. Rost (57) ABSTRACT

An agricultural machine includes a main frame, an adjustable frame coupled to the main frame and, a row unit which includes a linking arm coupled to the adjustable frame, and an actuator coupled to the main frame and the adjustable frame. The agricultural machine also includes a controller configured to command the actuator to output various downforces to the row units based on signals received from one or more sensors. The one or more sensors are configured to measure one more indicators associated with an actual height of the row unit relative to ground.

20 Claims, 5 Drawing Sheets

(56) References Cited

U.S. PATENT DOCUMENTS

| | | | |
|---|---|---|---|
| 2020/0375085 A1* | 12/2020 | Strnad | A01C 5/068 |
| 2021/0037693 A1* | 2/2021 | Sauder | A01C 7/205 |
| 2022/0117147 A1* | 4/2022 | Collin | A01C 7/08 |
| 2022/0151138 A1* | 5/2022 | Barry | A01C 5/064 |
| 2022/0377967 A1* | 12/2022 | Thompson | A01C 7/203 |
| 2023/0041214 A1* | 2/2023 | Bassett | A01C 7/205 |
| 2023/0247924 A1* | 8/2023 | Fanshier | A01B 63/32 |
| | | | 172/4 |
| 2023/0263085 A1* | 8/2023 | Fanshier | A01B 63/32 |
| | | | 172/4 |
| 2023/0263088 A1* | 8/2023 | Koch | A01B 47/00 |
| | | | 172/4 |

\* cited by examiner

GROUND FOLLOWING OPTIMIZATION WITH DOWNFORCE CONTROL SYSTEMS AND METHODS

FIELD OF THE DISCLOSURE

The present disclosure relates to an agricultural machine, such as a row planter having a rockshaft or other adjustable frame, and more particularly, to control systems and methods for optimizing the ground following of row units coupled to the adjustable frame of the row planter.

BACKGROUND OF THE DISCLOSURE

Work machines, such as those in the agricultural, construction, and forestry industries perform a variety of operations. In some instances, work machines are provided with a rockshaft frame or a different adjustable frame that may be adjusted relative to a main frame of the machine. In some instances, work machines are row crop planters having row units configured to distribute a commodity to the soil. The row units are configured to follow the adjustable frame along the ground to distribute commodity to the soil.

Tires and track sizes of row crop planters continue to grow such that they can no longer be mounted in conventional locations on the machine. There is a tendency to move the tires or tracks forward relative to the main frame of the machine. For some machines, this means that the pivot point about which the adjustable frame rotates may reside in a different location as well, sometimes further from the row units. Additionally, as the terrain changes and becomes more challenging, the row units need to travel further in the vertical direction relative to the main frame in order to maintain engagement with the soil. Such challenges create a need for more effective systems and methods for controlling adjustment of the adjustable frame so that the row units coupled thereto maintain optimal ground following, especially while traversing uneven terrain.

SUMMARY

In an illustrative embodiment of the present disclosure, a method of reactively controlling ground following of a row unit of an agricultural machine comprises: providing a main frame, an adjustable frame coupled to the main frame and configured to pass over a portion of ground, and the row unit which includes a linking arm pivotably coupled to the adjustable frame: determining an actual ground following indicator associated with an actual height of the row unit relative to the portion of ground; determining a desired ground following indicator associated with a desired height of the row unit relative to the portion of ground; comparing the desired ground following indicator to the actual ground following indicator; and adjusting the actual ground following indicator toward the desired ground following indicator, which includes adjusting an applied force output by at least one adjustable frame actuator that is coupled to the adjustable frame and the main frame based on the actual ground following indicator and the desired ground following indicator.

In some embodiments, adjusting the applied force output by the at least one adjustable frame actuator that is coupled to the adjustable frame and the main frame includes: sending a first signal to the at least one adjustable frame actuator coupled to the adjustable frame and the main frame; and adjusting an applied force output by the at least one adjustable frame actuator from a first applied force to a second applied force based on the first signal, wherein at the first applied force the actual ground following indicator is not equal to or within an predetermined threshold of the desired ground following indicator, and at the second force the actual ground following indicator is equal to or within the predetermined threshold of the desired ground following indicator.

In some embodiments, determining an actual ground following indicator includes: determining an applied force of the adjustable frame acting on the row unit. In some embodiments, determining the applied force of the adjustable frame acting on the row unit includes: measuring the applied force output by the at least one adjustable frame actuator via a load cell coupled to the at least one adjustable frame actuator. In some embodiments, determining the applied force of the adjustable frame acting on the row unit includes: measuring the applied force output by the at least one adjustable frame actuator via a pressure sensor coupled to the at least one adjustable frame actuator.

In some embodiments, determining an actual ground following indicator further includes at least one of: determining a position of the row unit relative to the adjustable frame; and measuring a parameter of the row unit irrespective of the adjustable frame. In some embodiments, determining an actual ground following indicator includes: measuring a reactive force applied by the ground to a gauge wheel coupled to the adjustable frame.

In some embodiments, determining an actual ground following indicator includes: determining a position of the row unit relative to the adjustable frame. In some embodiments, determining a position of the row unit relative to the adjustable frame includes: measuring an angle formed between the linking arm and at least one of: a portion of the adjustable frame and a portion of the row unit coupled to the linking arm. In some embodiments, determining a position of the row unit relative to the adjustable frame includes: measuring the position of a row unit actuator, which is configured to adjust the position of the linking arm relative to the adjustable frame. In some embodiments, determining a position of the row unit relative to the adjustable frame includes: measuring the distance between the adjustable frame and a portion of the linking arm of the row unit.

In some embodiments, determining an actual ground following indicator includes: measuring a parameter of the row unit irrespective of the adjustable frame. In some embodiments, measuring a parameter of the row unit irrespective of the adjustable frame includes: measuring the position of a gauge wheel of the row unit relative to a shank of the row unit, wherein the gauge wheel is coupled to the shank. In some embodiments, measuring a parameter of the row unit irrespective of the adjustable frame includes: measuring the position of a row cleaner of the row unit relative to a shank of the row unit, wherein the row cleaner is pivotably coupled to the shank. In some embodiments, measuring a parameter of the row unit irrespective of the adjustable frame includes: measuring, with an ultrasonic sensor, the distance between the ground and a portion of the row unit. In some embodiments, measuring a parameter of the row unit irrespective of the adjustable frame includes: measuring the position of a closing wheel of the row unit relative to a shank of the row unit, wherein the closing wheel is pivotably coupled to the shank.

In some embodiments, measuring a parameter of the row unit irrespective of the adjustable frame includes: measuring a reactive force applied by the ground to a gauge wheel of the row unit. In some embodiments, measuring a parameter of the row unit irrespective of the adjustable frame includes:

determining a ground contact value indicative of a percentage of time that a gauge wheel of the row unit is in contact with the ground.

In some embodiments, determining the desired ground following indicator includes: accessing the desired ground following indicator from a memory of the work machine on which the ground following indicator is stored. In some embodiments, the method further comprises: receiving a signal indicative of a desired ground following indicator from a user input device prior to accessing the desired ground following indicator stored on the memory of the work machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
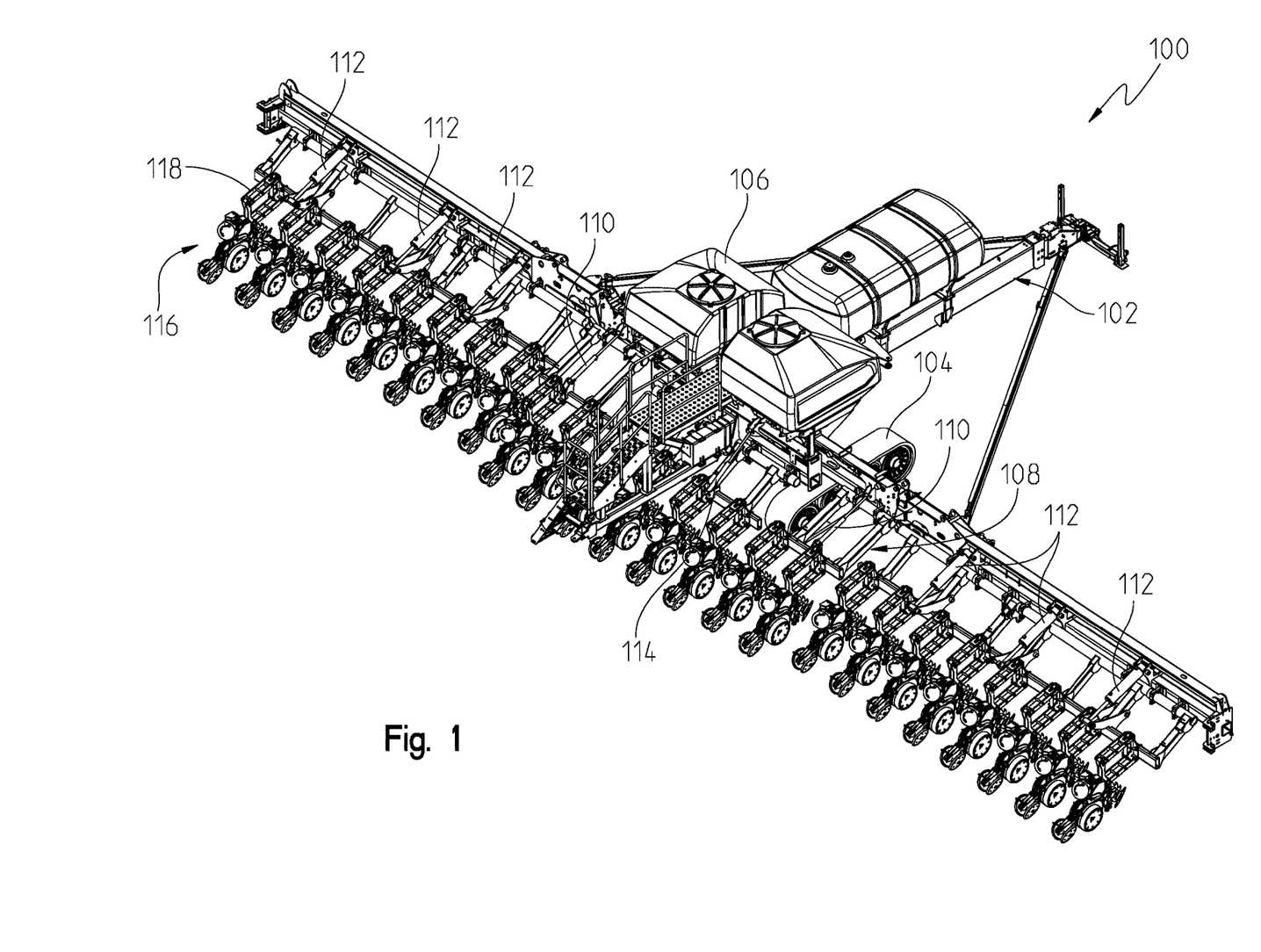
FIG. 1 is a perspective view of an agricultural machine showing a main frame, an adjustable frame moveable relative to the mainframe and configured to output various applied forces, and row units coupled to the adjustable frame.

Referring to FIG. 1, an exemplary embodiment of an agricultural machine 100 such as a row crop planter is shown. The agricultural machine 100 includes a main frame 102 supported above the ground by ground engaging mechanisms 104 such as tracks. The main frame 102 supports one or more commodity containers such as the container 106. The main frame 102 is coupled to an adjustable frame 108, which is movable relative to the main frame 102, and which outputs an applied downforce, as described in greater detail below. The agricultural machine 100 further includes at least one adjustable frame actuator that is coupled at a first end to the main frame 102 and at a second end to the adjustable frame 108. The at least one adjustable frame actuator is configured to extend and contract to adjust the downforce output by the adjustable frame 108.

In the illustrative embodiment, the at least one adjustable frame actuator comprises a first plurality of commonly-sized actuators 110, a second plurality of commonly-sized actuators 112, and a third plurality of common-sized actuators 114 (only one of which is visible in FIG. 1). Each plurality of commonly-sized actuators is configured to adjust the downforce output by a different portion of the adjustable frame 108. While the pluralities of actuators 110, 112, 114 and the adjustable frame 108 are described in an illustrative fashion herein, it should be appreciated that the control systems and methods described herein are applicable to any adjustable frame that is configured to output various downforces via movement of one or more actuators. In the disclosure to follow, for simplicity, reference may be made to an adjustable frame actuator 110; however, it should be appreciated that the related descriptions are applicable to any suitable adjustable frame actuator including the adjustable frame actuators 110, 112, 114, and others.

Referring still to FIG. 1, the agricultural machine 100 includes a plurality of row units 116 coupled to a rearward end of the adjustable frame 108. Each row unit 116 includes a pair of linking arms (e.g., arm 118) pivotably coupled to the rearward end of the adjustable frame 108. Each row unit 116 is configured to receive commodity from the one or more containers 106 and delivery the commodity to the soil. The commodity must be delivered to the soil at an optimal depth to maximize crop yield, and therefore, each row unit 116 should be maintained at a desired height relative to the ground. The actual height of a row unit 116 relative to the ground may be adjusted by adjusting the downforce output by the adjustable frame 108 and applied to the row units 116. The concept may be referred to as adjusting the "ground following" of the row units 116 relative to the adjustable frame 108. Various characteristics of the agricultural machine 100 may be measured, determined, adjusted, and/or controlled to reactively control ground following of the row units 116. Such characteristics may be collectively referred to as an actual ground following indicator 200. The ground following indicator may include characteristics of other components of the agricultural machine, in addition to the row units 116, as described herein.

It should be appreciated that this disclosure is not limited to the agricultural machine shown in FIG. 1, and this disclosure contemplates that the agricultural machine may include any one of an autonomous planter body, a toolbar, a rockshaft, a tractor having an adjustable hitch, or any other applicable configuration. In each example, the agricultural machine includes a main frame, an adjustable fame movable relative to the main frame, and a plurality of row units coupled to the adjustable frame. For example, the agricultural machine may be an autonomous planter body, e.g., the type shown in U.S. Pat. No. D808442, the disclosure of which is hereby incorporated by reference in its entirety. In other embodiments, the agricultural machine may be an integral planter including a tractor having a main fame and a hitch movable vertically relative to the main frame. The hitch is configured to be secured to an adjustable frame, and row units are coupled at a rear end of the adjustable frame. The adjustable frame may be moved relative to the main frame via vertical movement of the hitch based on an actual ground following indicator associated with the row units or other components of the agricultural machine. Movement of an adjustable frame relative to a main frame based on an actual ground following indicator is described in greater detail herein.

Figure 2:
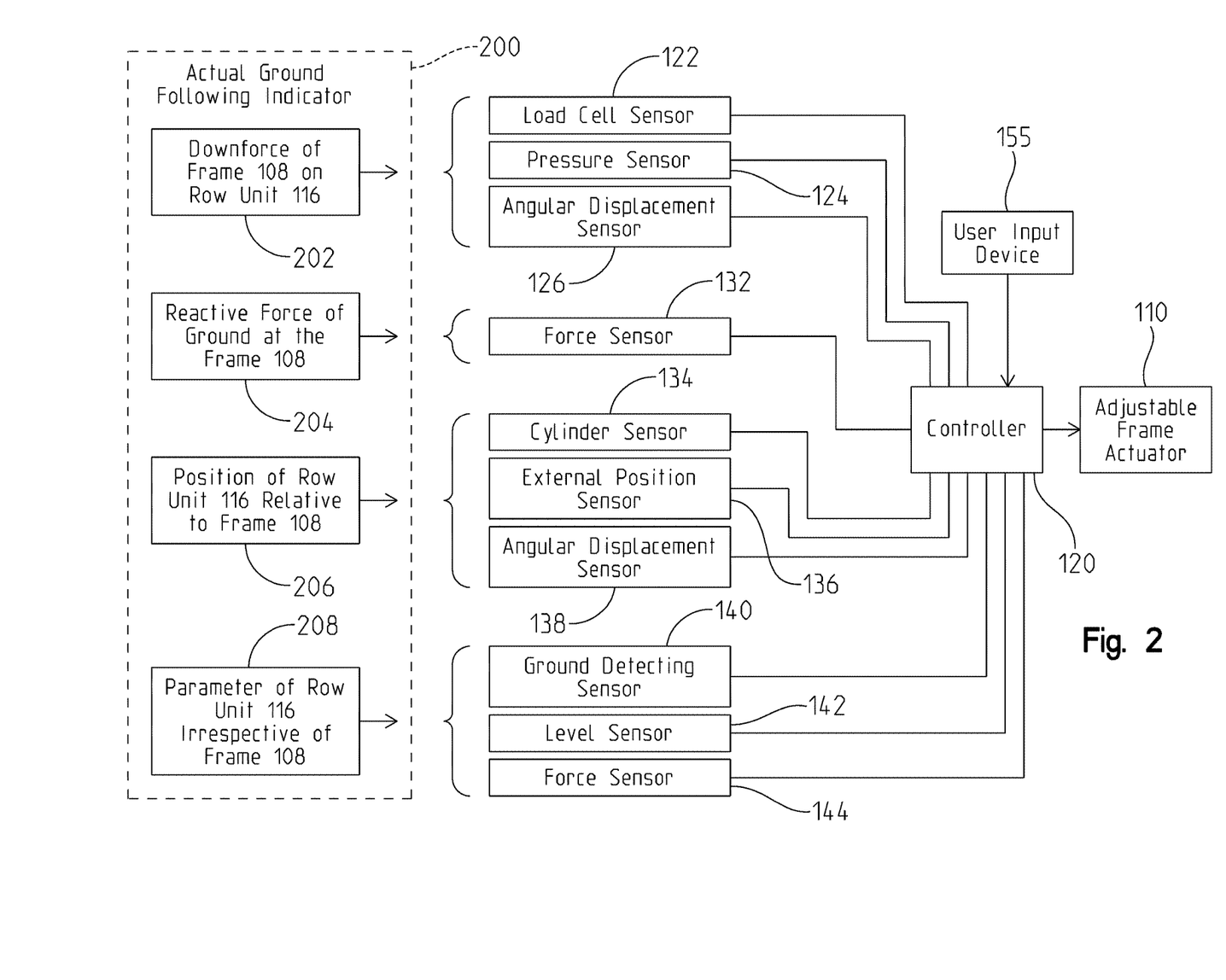
FIG. 2 is a diagrammatic flow chart showing actual ground following indicators, sensors configured to measure the actual ground following indicators, a controller configured to receive signals indicative of measurements from the sensors, and an adjustable frame actuator that is adjustable by command of the controller based on the measurements received from the sensors.

As suggested by FIG. 2, the actual ground following indicator 200 may include one or more values or placeholders (e.g., reference numbers 202, 204, 206, 208), which are indicative of: (i) an applied force of the adjustable frame 108 acting on the row unit 116; (ii) a reactive force applied by the ground to a component of the work machine 100 that is coupled to the adjustable frame 108; (iii) a position of the row unit 116 relative to the adjustable frame 108; and (iv) a parameter of the row unit 116 irrespective of (i.e. determinable independently of) the adjustable frame 108.

Figure 3:
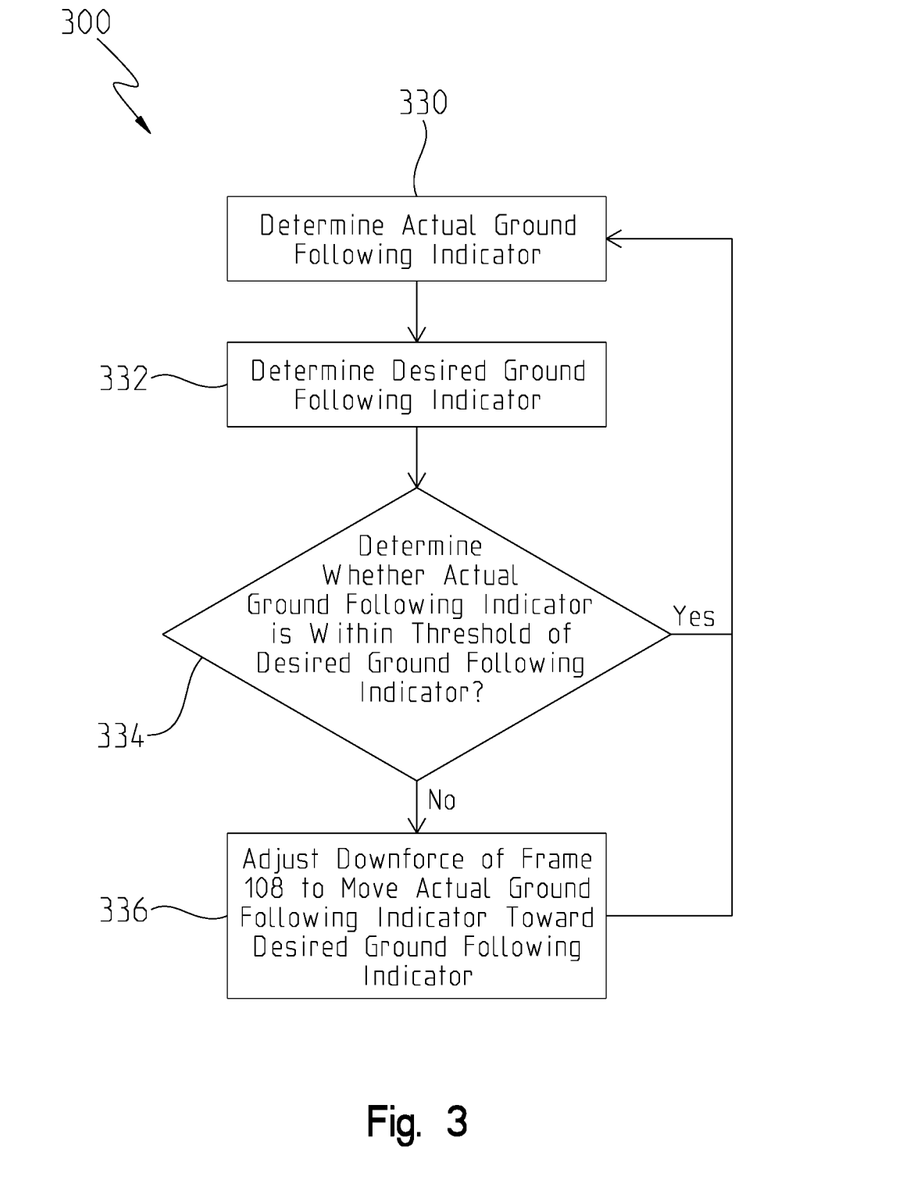
FIG. 3 is a flow chart showing a method of operation using the controller.

As shown in FIG. 3, a control method 300 may be used to reactively control the height of a row unit 116 relative to the ground. In the control method 300, a desired ground following indicator 302 is compared to an actual ground following indicator 200, and the position of the adjustable frame 108 is adjusted relative to the main frame 102 based on the actual ground following indicator 200 and the desired ground following indicator 302. A more detailed description of method 300 is provided herein.

Figure 4:
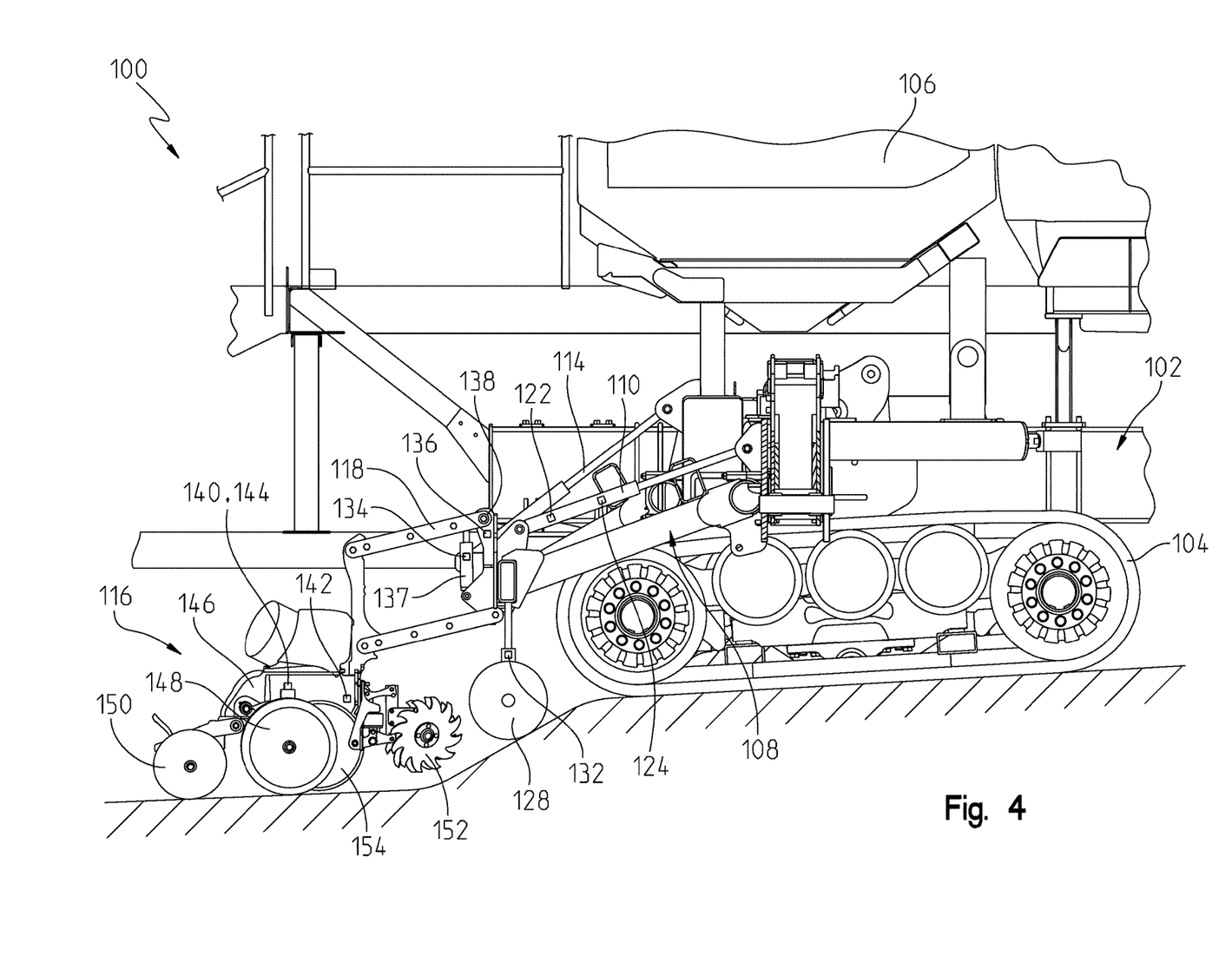
FIG. 4 is a cross-section view of a portion of the agricultural machine of FIG. 1 showing the adjustable frame actuator coupled to the main frame and the adjustable frame, and showing the sensors of the agricultural machine positioned on a row unit, the adjustable frame, and elsewhere on the machine.

Referring first to FIGS. 2 and 4, the agricultural machine 100 includes a controller 120 operatively coupled to the adjustable frame actuators described herein (e.g. actuator 110). The controller 120 is configured to send an electrical signal to the adjustable frame actuator 110 to adjust the applied force output by the adjustable frame actuator 110 from a first applied force to a second applied force based on the electrical signal. The controller 120 is operatively coupled to a plurality of sensors of the agricultural machine 100, as will be described in greater detail below. The controller 120 is configured to receive signals from the sensors, and the controller 120 is configured to adjust the adjustable frame actuator 110 based on the received signals.

In the illustrative embodiment, the controller 120 may be a single controller or a plurality of controllers, which may be operatively coupled to each other. The controller 120 includes a memory and a processor configured to execute instructions (i.e. algorithmic steps) stored on the memory. The controller 120 may be operatively coupled (i.e. hardwired or connected wirelessly) to other components of the agricultural machine 100 as well. If hardwired, the controller 120 may be connected to the components via wires, and if connected wirelessly, the controller 120 may be connected to the components via Wi-Fi, Bluetooth, or other known means of wireless communication. Thus, the controller 120 may be positioned on the agricultural machine 100 or positioned remotely, away from the agricultural machine 100.

As described above, in some embodiments, the actual ground following indicator 200 comprises a value indicative of an applied force of the adjustable frame 108 acting on the row unit 116. This particular ground following indicator is represented by reference number 202 in FIG. 2. As suggested by FIGS. 2 and 4, the agricultural machine 100 includes at least one sensor configured to measure the applied force of the adjustable frame 108 acting on the row unit 116.

In some embodiments, the at least one sensor is at least one of a load cell 122 coupled to the adjustable frame actuator 110 and a pressure sensor 124 coupled to the adjustable frame actuator 110. In some embodiments, the sensors 122, 124 operate simultaneously and are each present, and in other embodiments the sensors 122, 124 exist only as alternatives to each other.

As suggested in FIG. 4, the load cell 122 is configured to measure the applied force output by the adjustable frame actuator 110. The load cell 122 is operatively coupled to the controller 120 and configured to send a signal to the controller 120 indicative of the applied force output by the adjustable frame actuator 110. Based on the signal, the controller 120 is configured to determine the applied force of the adjustable frame 108 acting on the row unit 116.

The pressure sensor 124 is configured to measure the applied force output by the adjustable frame actuator 110. In such embodiments, the pressure sensor 124 is operatively coupled to the controller 120 and configured to send a signal to the controller 120 indicative of the applied force output by the adjustable frame actuator 110. Based on the signal, the controller 120 is configured to determine the applied force of the adjustable frame 108 acting on the row unit 116.

The applied force of the adjustable frame 108 acting on the row unit 116 (i.e. the applied force output by the adjustable frame actuator 110), may be indicative of the change in slope of the ground that the agricultural machine 100 is traversing. The feedback received by the controller 120 regarding the applied force output by the adjustable frame actuator 110 may be used to adjust the applied force output by the adjustable frame 108 to optimize ground following of the row units 116. Feedback regarding the adjustable frame actuator 110 may be desirable since the main frame 102 and the adjustable frame 108 (the components to which the adjustable frame actuator 110 is coupled) are positioned forward of the row unit 116, and therefore, the row unit 116 has not yet traversed the portion of the ground for which the feedback is provided. Therefore, the adjustable frame 108 may be adjusted prior to the row unit 116 traversing the portion of ground at issue. This adjustment process is described in greater detail below with reference to method 300.

Referring again to FIG. 2, in some embodiments, the actual ground following indicator 200 comprises a value indicative of a reactive force applied by the ground to a frame gauge wheel 128. In other words, this is the reactive force applied by the ground at the location of the adjustable frame 108. This particular ground following indicator is represented by reference number 204 in FIG. 2. As suggested in FIGS. 2 and 4, the agricultural machine 100 includes a force sensor 132 coupled to the frame gauge wheel 128 and configured to measure the reactive force applied by the ground. As shown in FIG. 2, the force sensor 132 is operatively coupled to the controller 120 and configured to send a signal thereto indicative of the reactive force applied by the ground to the frame gauge wheel 128.

The reactive force applied by the ground to the frame gauge wheel 128, may be indicative of the change in slope of the ground that the agricultural machine 100 is traversing. The feedback received by the controller 120 regarding the reactive force applied by the ground to the frame gauge wheel 128 may be used to adjust the position of the adjustable frame 108 relative to the main frame 102 to optimize ground following of the row units 116. Feedback from the frame gauge wheel 128 may be desirable since the frame gauge wheel 128 is positioned forward of the row unit 116, and therefore, the row unit 116 has not yet traversed the portion of the ground for which the frame gauge wheel 128 provides feedback. Therefore, the adjustable frame 108 may be adjusted prior to the row unit 116 traversing the portion of ground at issue. This adjustment process is described in greater detail below with reference to method 300.

Figure 5:
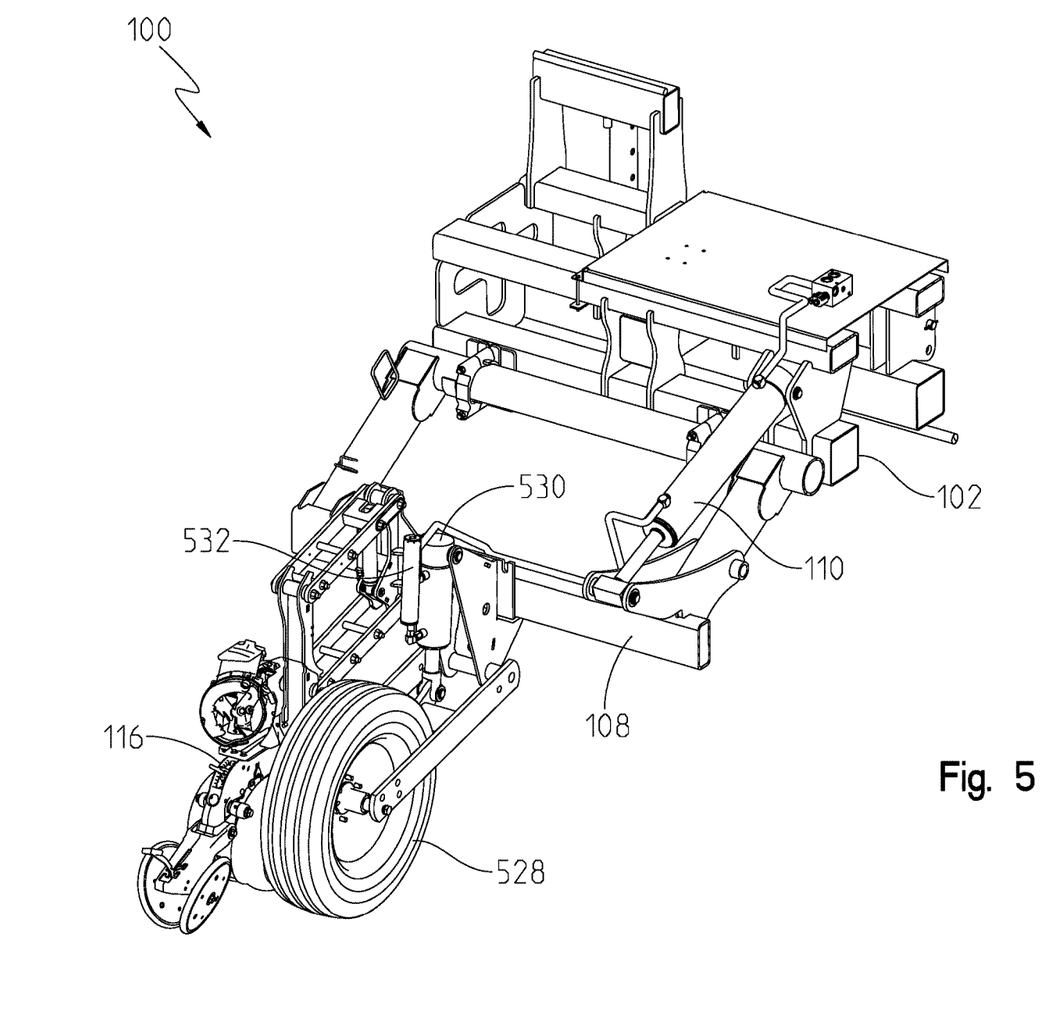
FIG. 5 is a cross-section view of a portion of the agricultural machine of FIG. 1 showing an embodiment in which a gauge wheel coupled to the adjustable frame is aligned with the row unit and hydraulically coupled to a gauge wheel cylinder and the adjustable frame actuator.

Referring now to FIG. 5, another embodiment of the agricultural machine 100 is shown. The embodiment includes a gauge wheel 528 provided in place of the frame gauge wheel 128. Contrary to the frame gauge wheel 128, which is positioned forward of the row unit 116, the gauge wheel 528 is aligned with the row unit 116 as shown in FIG. 5. The gauge wheel 528 is coupled to and extends downwardly from a portion of the adjustable frame 108. In some embodiments, an external position sensor may be configured to measure a position of the gauge wheel 528 relative to the adjustable frame 108. Further, as described in the above embodiments, a force sensor may be coupled to the gauge wheel 528 and configured to measure the reactive force applied by the ground to the gauge wheel 528.

In the illustrative embodiment shown in FIG. 5, the gauge wheel 528 includes a pressurized cylinder 530 configured to extend or retract, yet the gauge wheel 528 does not include a pressure sensor nor a force sensor. The cylinder 530 is hydraulically coupled to an accumulator 532 configured to maintain a relatively constant pressure within the cylinder 530, as is known in the art. The cylinder 530 is also hydraulically coupled to the actuator 110. The actuator 110 may be embodied as a pressurized cylinder having a predetermined pressure setting. The predetermined pressure setting may be determined based a number of variables, e.g., machine type, downforce of the row unit 116, and others.

During operation of the agricultural machine 100, the gauge wheel 528 interacts with the ground as the row unit 116 adjacent the gauge wheel 528 transverses an adjacent portion of the ground. Therefore, the gauge wheel 528 acts as an actual ground following indicator. When the ground applies an upward force to the gauge wheel 528, the pressure in the cylinder 530 has a tendency to increase, which urges the pressure in the actuator 110 to increase. As a result, because the actuator 110 is hydraulically coupled to the cylinder 530, (and mechanically coupled to adjustable frame 108 and the main frame 102), the adjustable frame 108 is moved relative to the main frame 102 based on the force applied by the ground to the gauge wheel 530. This arrangement sufficiently maintains contact between the gauge wheel 528 and the ground during operation of the agricultural machine 100, and because the gauge wheel 528 is aligned with the row unit 116, the arrangement sufficiently maintains contact between the row unit 116 and the ground.

Referring again to FIG. 2, in some embodiments, the actual ground following indicator 200 comprises a value indicative of a position of a row unit 116 relative to the adjustable frame 108. This particular ground following indicator is represented by reference number 206 in FIG. 2. As suggested by FIGS. 2 and 4, the agricultural machine 100 includes at least one sensor configured to measure the position of a row unit 116 relative to the adjustable frame 108. In some embodiments, the at least one sensor takes the form of at least one of: a cylinder sensor 134 of an Individual Row Hydraulic Downforce (IRHD) actuator 137, an external position sensor 136, and an angular displacement sensor 138. In some embodiments, sensors 134, 136, 138 operate simultaneously and are each present, and in other embodiments the sensors 134, 136, 138 exist only as alternatives to each other.

As shown in FIG. 4, the cylinder sensor 134 is configured to measure a position of a piston relative to a position of a cylinder of the IRHD actuator 137. The cylinder sensor 134 is operatively coupled to the controller 120 and configured to send a signal to the controller 120 indicative of the relative position of the piston of the IRHD actuator 137. Based on the relative position of the piston, the controller 120 is configured to determine the position of the row unit 116 relative to the adjustable frame 108.

As suggested by FIG. 4, the external position sensor 136 is configured to measure the distance between a portion of the row unit 116 and a portion of the adjustable frame 108. In some embodiments, the external position sensor 136 is configured to measure a distance between a portion of a linking arm (e.g., linking arm 118) and a rearward portion of the adjustable frame 108. The external position sensor 136 is operatively coupled to the controller 120 and configured to send a signal to the controller 120 indicative of the distance between the portion of the row unit 116 and the portion of the adjustable frame 108.

In some embodiments, the external position sensor 136 may be an ultrasonic sensor having a target, in which case, the ultrasonic sensor is coupled to one of the row unit 116 and the adjustable frame 108, and the target is on the other of the row unit 116 and the adjustable frame 108. Based on the distance between ultrasonic sensor and the target, the controller 120 is configured to determine the position of the row unit 116 relative to the adjustable frame 108.

In some embodiments, the external position sensor 136 may be a proximity sensor configured to emit an electromagnetic field or a beam of electromagnetic radiation (e.g., infrared) to measure the distance between the portion of the row unit and the portion of the adjustable frame 108. Based on the distance between the portion of the row unit 116 and the portion of the adjustable frame 108, the controller 120 is configured to determine the position of the row unit 116 relative to the adjustable frame 108.

As described above, in some embodiments, the external position sensor 124 may be arranged and configured to measure a distance between a portion of the adjustable frame 108 and the ground. In some embodiments, a distance between a portion of the row unit 116 and the ground may be a predefined value stored in the memory of the controller 120. Alternatively, the work machine 100 may include another sensor (e.g., gauge wheel, proximity sensor, ultrasonic sensor) configured to measure the distance between the portion of the row unit 116 and the ground. In any event, the controller 120 is configured to compare the distance between the portion of the row unit 116 and the ground to the distance between the portion of the adjustable frame 108 and the ground. Based on the comparison, the controller 120 is configured to determine the position of the row unit 116 relative to the adjustable frame 108.

As suggested by FIG. 4, the angular displacement sensor 138 is configured to measure the angular displacement (or angle) of the row unit 116 relative to the adjustable frame 108. In some embodiments, the angular displacement sensor 138 is configured to measure the angular displacement (or angle) of a linking arm (e.g., linking arm 118) relative to a rearward portion of the adjustable frame 108. The angular displacement sensor 138 is operatively coupled to the controller 120 and configured to send a signal to the controller 120 indicative of the angular displacement (or angle) of the row unit 116 relative to the adjustable frame 108. The angular displacement sensor 138 may be, for example, a Hall-Effect sensor or a potentiometer. Based on the angular displacement (or angle) between the row unit 116 and the adjustable frame 108, the controller 120 is configured to determine the position of the row unit 116 relative to the adjustable frame 108.

In some embodiments, the angular displacement sensor 138 is configured to measure the angular displacement (or angle) of a linking arm (e.g., linking arm 118) relative to a forward portion of the row unit 116, which is sometimes referred to as the goal post of the row unit 116. In this case, the angle between the linking arm 118 and the rearward portion of the adjustable frame 108 may be known and/or fixed due to the IRHD actuator 137. Therefore, based on the angular displacement (or angle) between the goal post and the linking arm 118, the controller 120 is configured to determine the position of the row unit 116 relative to the adjustable frame 108.

The position of the row unit 116 relative to the adjustable frame 108, may be indicative of the change in slope of the ground that the agricultural machine 100 is traversing. The feedback received by the controller 120 regarding the position of the row unit 116 relative to the adjustable frame 108 may be used to adjust the position of the adjustable frame 108 relative to the main frame 102 to optimize ground following of the row units 116. While still useful, the feedback regarding the position of the row unit 116 relative to the adjustable frame 108 may be less desirable than other feedback described herein. This is because the row unit 116 is traversing a portion of the ground as feedback is provided for that same portion of ground. Therefore, the adjustable frame 108 may be adjusted as the row unit 116 is traversing the portion of ground at issue. This adjustment process is described in greater detail below with reference to method 300.

As described above, in some embodiments, the actual ground following indicator comprises a value indicative of a parameter of the row unit 116 that is determinable independently of the position or downforce of the adjustable frame 108. This particular ground following indicator is represented by reference number 208 in FIG. 2. The agricultural machine 100 includes at least one sensor configured to measure the parameter associated with the row unit 116 independently. As suggested by FIGS. 2 and 4, the at least one sensor includes at least one of a ground detecting sensor 140, a level sensor 142, and a force sensor 144, each of which will be described in greater detail below. In some embodiments, sensors 140, 142, 144 operate simultaneously and are each present, and in other embodiments the sensors 140, 142, 144 exist only as alternatives to each other.

As shown in FIG. 4, in the illustrative embodiment, each row unit 116 includes a shank 146, a row unit gauge wheel 148, a closing wheel 150, a row cleaner 152, and an opening disc 154. The row unit gauge wheel 148 is coupled to and moveable vertically relative to the shank 146. The closing wheel 150 is pivotably coupled to the shank 146 at a rear end thereof. The row cleaner 152 is coupled to the shank 146 at a forward end thereof. The opening disc 154 is coupled to the forward end of the shank 146 rearward of the row cleaner 152 and is moveable vertically relative to the shank 146 via a cylinder or other actuator. After a row is cleared by the row cleaner 152, the opening disc 154 opens a trench in which a commodity is placed prior to the trench being closed by the closing wheel 150.

The ground detecting sensor 140 may take several different forms as described below. For example, the ground detecting sensor 140 may include an external position sensor (e.g., ultrasonic sensor with a target, proximity sensor) and/or a cylinder sensor. For example, the ground detecting sensor 140 may be coupled to the row unit gauge wheel 148 directly or indirectly, and configured to measure the height of the row unit 116 relative to the ground based on vertical movement of the row unit gauge wheel 148 as the row unit gauge wheel 148 interacts with the ground. For further example, the ground detecting sensor may be an ultrasonic sensor configured to measure the distance between a portion of the row unit 116 and the ground directly. In some embodiments, the ground detecting sensor 140 may be coupled to the opening disc 154, directly or indirectly, and configured to measure the height of the row unit 116 relative to the ground based the sensor 140 detecting the height of the opening disc 154 relative to the surface of the soil. For example, the ground detecting sensor 140 may measure the trench depth created by movement of the opening disc 154 through the soil. In any case, as shown in FIG. 2, the ground detecting sensor 140 is operatively coupled to the controller 120 and configured to send a signal to the controller 120 indicative of the distance between a portion of the row unit 116 and the ground.

The level sensor 142 may take several different forms as described below. The level sensor 142 is configured to measure the positions of different components of the row unit 116 relative to each other. For example, the row unit 116 may include an external position sensor (e.g., ultrasonic sensor with a target, proximity sensor) and/or an angular displacement sensor (e.g., potentiometer, Hall-Effect sensor). In some embodiments, the level sensor 142 is configured to measure the position of the shank 142 relative to and at least one of the row unit gauge wheel 148, the closing wheel 146, and the row cleaner 152. As shown in FIG. 2, the level sensor 142 is operatively coupled to the controller 120 and configured to send a signal to the controller 120 indicative of the relative positions of different components of the row unit 116, as described above.

Referring still to FIG. 4, the force sensor 144 is coupled to the row unit gauge wheel 148 and configured to measure a reactive force applied by the ground to the row unit gauge wheel 148. The force sensor 144 is also configured to measure a ground contact value, which is a value indicative of a percentage of time that the row unit gauge wheel 148 is in contact with the ground. The force sensor 144 is operatively coupled to the controller 120 and configured to send signals to the controller 120 indicative of the force applied by the ground to the row unit gauge wheel 148 and indicative of the percentage of time that the row unit gauge wheel 148 is in contact with the ground.

Each parameter of the row unit 116 that is determinable independently of the position or downforce of the adjustable frame 108 may be indicative of the change in slope of the ground that the agricultural machine 100 is traversing. The feedback received by the controller 120 regarding the parameters of the row unit 116 may be used to adjust the downforce of the adjustable frame 108 to optimize ground following of the row units 116. While still useful, the feedback regarding the parameters of the row unit 116 may be less desirable than other feedback described herein. This is because the row unit 116 is traversing a portion of the ground as feedback is provided for that same portion of ground. Therefore, the adjustable frame 108 may be adjusted as the row unit 116 is traversing the portion of ground at issue. This adjustment process is described in greater detail below with reference to method 300.

As suggested in FIG. 2, the actual ground following indicator 202 is measured by one or more of the sensors 122, 124; the actual ground following indicator 204 is measured by the sensor 132; the actual ground following indicator 206 is measured by one or more of the sensors 134, 136, 138; and the actual ground following indicator 208 is measured by one or more of the sensors 140, 142, 144. Each sensor is configured send a signal to the controller 120 indicative of an actual ground following indicator, and each actual ground following indicator is associated with an actual height of the row unit 116 relative to the ground. In some embodiments, each of the sensors operate simultaneously, yet in other embodiments, certain sensors may exist only as alternatives to each other.

Referring now to FIG. 3, a desired ground following indicator 300, which is associated with a desired height of the row unit 116 relative to the ground, may be stored on the memory of the controller 120. In some embodiments, the agricultural machine 100 includes a user input device 154 operatively coupled to the controller 120 and configured to send a signal thereto indicative of a desired ground following indicator 300. In this case, the controller 120 may access the desired ground following indicator 300 from the memory subsequent to receiving the desire ground following indicator 300 from the user input device 154.

Referring now to FIG. 3, a desired ground following indicator 300, which is associated with a desired height of the row unit 116 relative to the ground, may be stored on the memory of the controller 120. In some embodiments, the agricultural machine 100 includes a user input device 155 operatively coupled to the controller 120 and configured to send a signal thereto indicative of a desired ground following indicator 300. In this case, the controller 120 may access the desired ground following indicator 300 from the memory subsequent to receiving the desire ground following indicator 300 from the user input device 155.

As shown in FIG. 3, at step 330, the controller 120 determines the actual ground following indicator 200, which is associated with an actual height of the row unit 116 relative to the ground. At step 332, the controller 120 determines the desired ground following indicator 302, which is associated with the desired height of the row unit 116 relative to the ground. At step 334, the controller 120 compares the desired ground following indicator 302 to the actual ground following indicator 200 to determine whether the actual ground following indicator 200 is equal to or within a predetermined threshold of the desired ground following indicator 302. At step 336, the controller 120 adjusts the actual ground following indicator 200 toward the desired ground following indicator 302 if the actual ground following indicator 200 is not equal to or within a predetermined threshold of the desired ground following indicator 302.

In other words, if the actual ground following indicator 200 is not equal to or within a predetermined threshold of the desired ground following indicator 302, the controller 120 sends a signal to the adjustable frame actuator 110 commanding the adjustable frame actuator 110 to extend or retract to adjust the applied downforce of the adjustable frame 108 from a first applied downforce to a second applied downforce. At the first applied downforce, the actual ground following indicator 200 is not equal to or within the predetermined threshold of the desired ground following indicator 302, and at the second applied downforce the actual ground following indicator 200 is equal to or within the predetermined threshold of the desired ground following indicator 302. When the actual ground following indicator 200 is equal to or within the predetermined threshold of the desired ground following indicator 302, ground following of the row unit 116 is optimized such that the row unit 116 is at an optimal height relative to the ground. The process 300 is repeated throughout operation of the agricultural machine 100.

It should be appreciated that the disclosure herein is applicable to agricultural machines having adjustable frames (e.g., frame 108) including multiple sections. For example, the disclosure is applicable the agricultural machine 100 shown in FIGS. 1 and 4, in which each section of the adjustable frame 108 is adjustable by a different plurality of commonly-sized actuators (e.g., actuators 110, actuators 112, actuators 114). The disclosure is also applicable to adjustable frames having a single section. This disclosure is therefore applicable to drawn planters, integral planters, and any other row crop planters having row units and an adjustable frame configured to applied different downforces to the row units via adjustment of one or more actuators.

It should be appreciated that the disclosure herein is applicable to agricultural machines having multiple row units 116, such as the arrangement shown in FIG. 1. In some embodiments, the controller 120 may determine an actual ground following indicator 200 for each row unit 116 of the agricultural machine 100, and the controller 120 may average, or otherwise obtain, a single value based on the plurality of values originally determined. The controller 120 may then compare the single (e.g., averaged) value of the actual ground following indicator 200 to the desired ground following indicator 302. The controller 120 may adjust the downforce output by the adjustment frame 108 to the row units 116 as necessary based on the comparison, in accordance with method 300. This process is repeated throughout operation of the agricultural machine 100.

In some embodiments, the controller 120 may receive an actual ground following indicator 200 for each row unit 116 of the agricultural machine 100, and the controller 120 may compare each actual ground following indicator 200 individually to the desired ground following indicator 302. In such embodiments, the controller 120 determines whether the number of row units 116, which have an actual ground following indicator 200 that is equal to or within a threshold range of the desired ground following indicator 302, is below a predetermined threshold number of row units 116 that are required to have an actual ground following indicator 200 that is equal to or within the predetermined threshold of the desired ground following indicator 302. If the controller 120 determines that an insufficient number of row units 116 have an actual ground following indicator 200 that is equal to or within the threshold range of the desired ground following indicator 302, then the controller 120 adjusts the downforce output by the adjustable frame 108, as described above. After the adjustment of the adjustable frame 108, the controller 120 will again determine whether a sufficient number of row units 116 have an actual ground following indicator 200 that is equal to or within the predetermined threshold of the desired ground following indicator 302. This process is repeated throughout operation of the agricultural machine 100.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of reactively controlling ground following of a row unit of an agricultural machine
   that includes a main frame, an adjustable frame coupled to the main frame and configured to pass over a portion of terrain, and the row unit, which includes a linking arm pivotably coupled to the adjustable frame, the method including:
   determining an actual ground following indicator associated with an actual height of the row unit relative to the portion of terrain;
   determining a desired ground following indicator associated with a desired height of the row unit relative to the portion of terrain;

comparing the desired ground following indicator to the actual ground following indicator; and adjusting the actual ground following indicator toward the desired ground following indicator, which includes adjusting the force applied by at least one adjustable frame actuator that is coupled to the adjustable frame and the main frame based on the actual ground following indicator and the desired ground following indicator.

2. The method of claim 1, wherein adjusting the force applied by the at least one adjustable frame actuator that is coupled to the adjustable frame and the main frame includes:

sending a first signal to the at least one adjustable frame actuator coupled to the adjustable frame and the main frame; and adjusting the applied force output by the at least one adjustable frame actuator from a first applied force to a second applied force based on the first signal, wherein, at the first applied force, the actual ground following indicator is not equal to or within an predetermined threshold of the desired ground following indicator, and, at the second applied force, the actual ground following indicator is equal to or within the predetermined threshold of the desired ground following indicator.

3. The method of claim 1, wherein determining the actual ground following indicator includes:

determining an applied force of the adjustable frame acting on the row unit.

4. The method of claim 3, wherein determining the applied force of the adjustable frame acting on the row unit includes:

measuring the applied force output by the at least one adjustable frame actuator via a load cell coupled to the at least one adjustable frame actuator.

5. The method of claim 3, wherein determining the applied force of the adjustable frame acting on the row unit includes:

measuring the applied force output by the at least one adjustable frame actuator via a pressure sensor coupled to the at least one adjustable frame actuator.

6. The method of claim 3, wherein determining the actual ground following indicator further includes at least one of:

determining a position of the row unit relative to the adjustable frame; and measuring a parameter of the row unit irrespective of the adjustable frame.

7. The method of claim 1, wherein determining the actual ground following indicator includes:

measuring a reactive force applied by the ground to a frame gauge wheel coupled to the adjustable frame.

8. The method of claim 1, wherein determining the actual ground following indicator includes:

determining a position of the row unit relative to the adjustable frame.

9. The method of claim 8, wherein determining the position of the row unit relative to the adjustable frame includes:

measuring an angle formed between the linking arm and at least one of: a portion of the adjustable frame and a portion of the row unit coupled to the linking arm.

10. The method of claim 8, wherein determining the position of the row unit relative to the adjustable frame includes:

measuring the position of a row unit actuator, which is configured to adjust the position of the linking arm relative to the adjustable frame.

11. The method of claim 8, wherein determining the position of the row unit relative to the adjustable frame includes:

measuring the distance between the adjustable frame and a portion of the linking arm of the row unit.

12. The method of claim 1, wherein determining the actual ground following indicator includes:

measuring a parameter of the row unit irrespective of the adjustable frame.

13. The method of claim 12, wherein measuring the parameter of the row unit irrespective of the adjustable frame includes:

measuring the position of a row unit gauge wheel of the row unit relative to a shank of the row unit, wherein the row unit gauge wheel is coupled to the shank.

14. The method of claim 12, wherein measuring the parameter of the row unit irrespective of the adjustable frame includes:

measuring, with an ultrasonic sensor, the distance between the ground and a portion of the row unit.

15. The method of claim 12, wherein measuring the parameter of the row unit irrespective of the adjustable frame includes:

measuring the position of an opening disc of the row unit relative to a surface of the ground.

16. The method of claim 12, wherein measuring the parameter of the row unit irrespective of the adjustable frame includes:

measuring the position of a closing wheel of the row unit relative to a shank of the row unit, wherein the closing wheel is pivotably coupled to the shank.

17. The method of claim 12, wherein measuring the parameter of the row unit irrespective of the adjustable frame includes:

measuring a reactive force applied by the ground to a row unit gauge wheel of the row unit.

18. The method of claim 12, wherein measuring the parameter of the row unit irrespective of the adjustable frame includes:

determining a ground contact value indicative of a percentage of time that a row unit gauge wheel of the row unit is in contact with the ground.

19. The method of claim 1, wherein determining the desired ground following indicator includes:

accessing the desired ground following indicator from a memory of the work machine on which the ground following indicator is stored.

20. The method of claim 19, further comprising:

receiving a signal indicative of the desired ground following indicator from a user input device prior to accessing the desired ground following indicator stored on the memory of the work machine.

* * * * *